Figure 1:
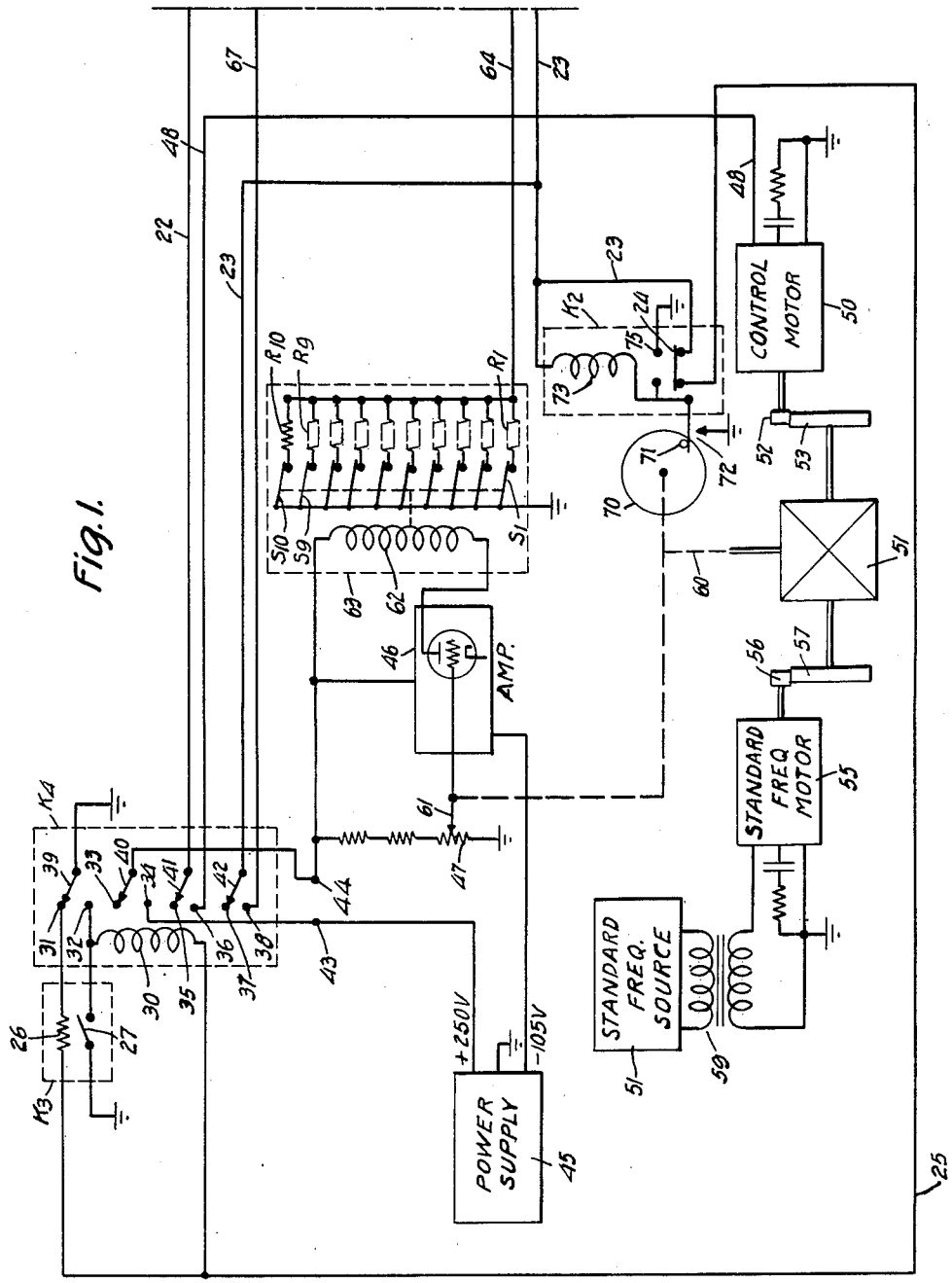

Jan. 15, 1957

C. B. GRADY, JR 2,777,985

MOTOR OR INVERTER SPEED REGULATION

Filed Oct. 3, 1955

2 Sheets-Sheet 1

INVENTOR.
Charles B. Grady Jr.
BY
Moser, Nolte & Nolte
ATTORNEYS

United States Patent Office 2,777,985
Patented Jan. 15, 1957

2,777,985

MOTOR OR INVERTER SPEED REGULATION

Charles B. Grady, Jr., West Orange, N. J., assignor to The W. L. Maxson Corporation, New York, N. Y., a corporation of New York Application October 3, 1955, Serial No. 537,933

9 Claims. (Cl. 322—39)

This invention relates to a motor speed regulator and particularly to a fail-safe system for such a regulator.

It is known to provide electric motors with speed regulators for controlling the speed thereof within certain limits. One type of regulator for controlling the speed of a motor consists of a carbon pile resistor in series with one of the windings of the motor, for example, the shunt winding. The resistance of the carbon pile may be controlled by a centrifugal governor driven by the motor shaft so that the carbon pile resistor will be adjusted in accordance with the motor speed to thereby regulate the current through the shunt winding in such a manner as to stabilize the frequency of the motor. Regulators of this type however, are capable of controlling the motor speed only within rather wide tolerances, for example, a motor adapted to drive an alternator producing a 400 cycle per second output may be controlled so as to keep the frequency of the alternator within ±10 cycles of its correct value. For certain applications, the speed of the motor and the frequency of the alternator must be controlled within much narrower limits, for example ±1 cycle per second.

In the system according to the present invention, a fine frequency control regulator is provided which normally maintains the frequency of the alternator within the required limits of, say, ±1 cycle per second. The precise regulator, however, may suffer a failure due, for example, to a vacuum tube failure. If a failure should occur, the fine frequency regulator would lose control and cause the system to run unregulated or repeatedly transfer from the coarse regulator to the fine regulator.

Accordingly, the present invention provides a fail-safe system which normally maintains the fine speed regulator in operation, but when a failure occurs in the fine speed regulator, operation by the fine speed regulator is discontinued and control of the motor is transferred to the coarse regulator. Thus hunting or a complete failure of the alternator output does not occur, but instead the alternator continues to provide a regulated output within the limits maintainable by the coarse speed regulator. Operation does not revert to the fine speed regulator until a reset control is operated, thus an opportunity is provided for clearing the trouble in the fine speed regulator and restoring operation thereof.

An object of the present invention is to provide a fine speed regulator for a motor or an inverter in addition to a coarse speed regulator and to enable the fine speed regulator to automatically take over control after starting and to remove control by the coarse speed regulator.

Another object of the invention is to provide a fail-safe system which transfers the control of the speed of the motor or alternator from a coarse control system to a fine control system and automatically transfers control back to the coarse control system and removes the fine control system from operation when a failure occurs in the fine control system.

A further object of the invention is to provide a motor control system having a coarse speed control and a fine speed control and means for preventing hunting between the coarse control system and the fine control system when failure occurs in the fine control system or when, for any reason, the phase of the motor advances a predetermined amount relative to that of a reference frequency.

Figure 2:
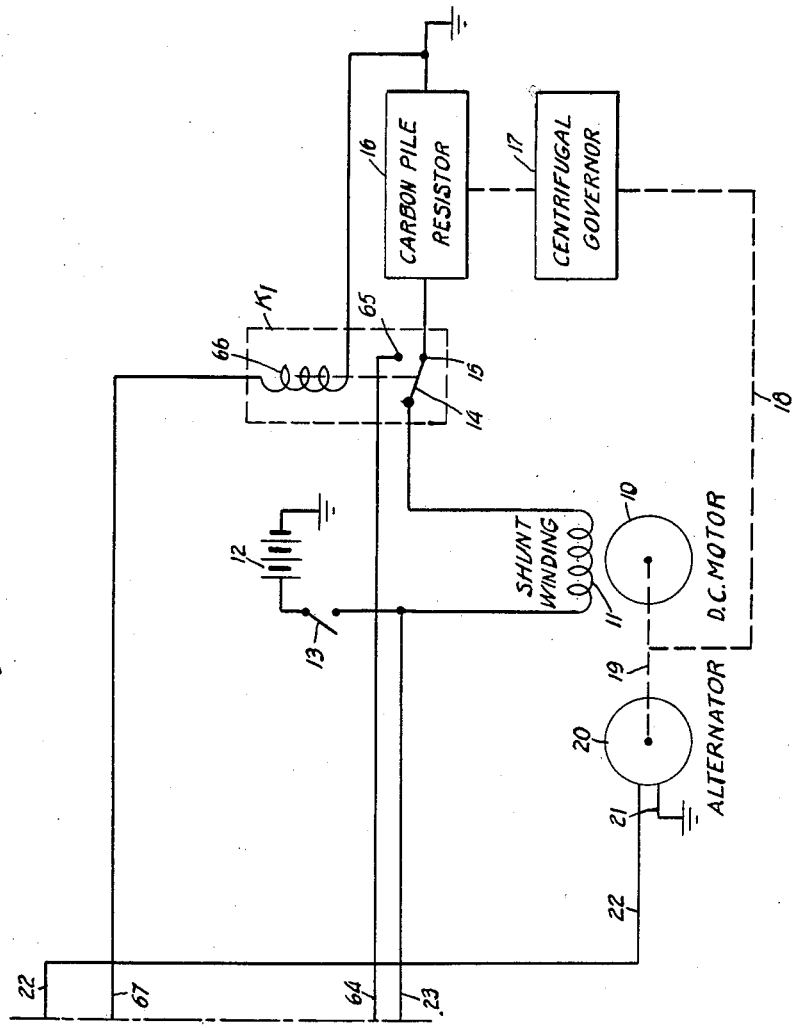

The above objects and other objects and advantages of the present invention will become apparent from the following description and the drawings in which:

Figs. 1 and 2 show a schematic circuit diagram of one embodiment of the present invention;

Referring to the drawing, D. C. motor 10 has a shunt winding 11, one end of which is connected to a direct current source 12 upon closure of a starting switch 13. The other end of winding 11 is connected through a movable contact arm 14 and a terminal 15 of a relay K1 and through a carbon pile resistor 16 to ground. The carbon pile resistor 16 may be adjusted by a centrifugal governor 17 having a mechanical connection 18 to the shaft 19 of the motor 10. The shaft 19 of the motor 10 is also connected through an alternator 20 having output connections 21 and 22. When the switch 13 is closed, motor 10 is energized and the current through the shunt winding is controlled by the carbon pile resistor, which is adjusted by the governor 17 in response to the speed of the motor so as to control the current through the shunt winding in such a manner as to regulate the speed of the motor 10. By such means, it is normally possible to control the frequency of the alternator which, in the present case, is assumed to be 400 cycles per second, within ±10 cycles per second. For certain application, however, such a frequency vibration is not tolerable and it is required to maintain the frequency of the alternator within ± say, 1 cycle per second. Accordingly, fine speed regulating means are provided.

Upon closure of switch 13, direct current is fed over connection 23 and through contactor 24 and connection 25 to the heating element 26 of a thermal relay K3. After a predetermined time, the thermal element 26 closes the switch 27 of relay K3 and thereby grounds the upper terminal of winding 30 of relay K4. The other side of winding 30 is connected to the D. C. connection 25 so that direct current is supplied to the winding 30 upon closure of the switch 27. Relay K4 has a plurality of terminals 31 to 38 which cooperate with movable contact arms 39 to 42 operated by the winding 30. The operation of relay K4 performs a number of functions. One of these functions is performed by the contact arm 40 closing against the terminal 34 to thereby make a connection between terminals 43 and 44 in the +250 volt plate supply from power supply 45. Completion of the connection between terminals 43 and 44 causes positive voltage to be supplied to a control amplifier 46 and a potentiometer 47, the function of which will be described hereinafter. Operation of relay K4 also causes the output of the alternator 20 to be fed over the connection 22, contact arm 41, terminal 36 and connection 48 to the control motor 50 so that the motor 50 begins to rotate at a speed corresponding to the frequency of the alternator output. Motor 50 drives one input shaft of a differential 51 through suitable gearing 52 and 53. Another input of differential 51 is driven by a standard frequency motor 55 through gearing 56 and 57. The motor 55 is driven at a standard speed by virtue of the fact that it is energized from a standard frequency source 58 through a suitable coupling such as the transformer 59. Any type of standard frequency source may be used. One such type, well known in the art, is a stabilized tuning fork adapted to provide a frequency of 400 cycle per second which is then amplified by vacuum tube power amplifiers to a sufficient level to drive the standard frequency motor 55.

The output of the differential 51 is equal to the difference between the speed of the control motor 50 and the standard frequency motor 55. The position of output shaft 60 of the differential will correspond to the integral of the speed deviations of motor 50. Shaft 60 is connected to the movable arm 61 of the potentiometer 47 in order to control the input signal to the amplifier 46 in accordance with the difference between the speeds of motor 50 and motor 55. Amplifier 46 may have a plurality of stages and may be a D. C. amplifier. The output of amplifier 46 is supplied to a winding 62 of a resistance regulator 63 of a type well known in the art. One regulator of this type is manufactured under the trade name "Regohm" by the Electric Regulator Company. The regulator 63 comprises a plurality of resistors R1 to R10, all of which have one terminal in common and each of which has its other terminal connected to a movable contact arm S1 to S10. As the winding 62 is increasingly energized, an increasing number of the contact arms S1–S10 are adapted to be opened, thereby increasing the effective resistance in the circuit. Resistors R1 to R10 are adapted to be connected in series with the shunt winding 11 by means of connections 64, contact arms 14, and terminal 65. Changeover relay K1 is operated in response to the operation of relay K4, by virtue of the fact that winding 66 of relay K1 is connected through connection 67, terminal 38 and contact arms 42 of relay K4 and connection 23 to the direct current source 12. Thus after operation of relay K4 and the resulting operation of changeover K1 control of the speed of motor 10 is transferred from the carbon pile 16 to the precise control system which operates the resistance regulator 63. The speed of motor 10 is then controlled by the precise control system and control by the coarse control apparatus, including centrifugal governor 17 and carbon pile 16, is discontinued.

The output shaft 60 of the differential 51 drives a cam 70 which may be in the form of a wheel having a pin 71 or any other suitable form. When the cam 70 turns through a given angle in response to an overspeed of the control motor 50 relative to the standard frequency motor 55, cam 70 is adapted to close a switch 72, which grounds one side of the winding 73 of relay K2. This moves the contactor 24 from the lower contacts to the upper contacts 75. Direct current is then removed from the connection 25 and the relay K4 releases, thereby disconnecting the plate voltage from the control amplifier 46, de-energizing motor 50, and releasing changeover relay K1 in order to transfer control back to the carbon pile 16. Closure of contactor 24 against the terminals 75 also locks the winding 73 closed and maintains the relay K2 operated. This relay is preferably of the type having a reset for resetting contactor 24 to the lower contacts and thereby restoring normal operation. If the fail-safe system operated by the cam 70 were not provided, a failure in the standard frequency circuit due, for example, to a failure of one of the vacuum tubes of the power amplifier connected to the standard frequency source, would cause misoperation and result in continuous hunting between precise motor frequency control and coarse motor frequency control circuits. However, with the present system, if any failure occurs resulting in an overspeed which turns the cam 70 through a predetermined angle, stable operation of the system is continued under control of the carbon pile 16 regulated by the centrifugal governor 17.

The operation of the system herein disclosed will be fully understood from the detailed description given above. In summary, it may be stated that upon closure of the switch 13, the motor 10 is energized. The speed of the motor 10 is controlled by the carbon pile 16 which, in turn, is regulated by the centrifugal governor 17 driven by the motor 10 through the connection 18. At the same time, thermal relay K3 is energized and after a predetermined time, energizes the winding 30 of the relay K4. Operation of the relay K4 applies the alternator output to the control motor 50 and also connects power supply 45 to the control amplifier 46. The control motor 50 acquires a speed corresponding to the output of the alternator 20 and, in the meantime, the relay K4 causes the changeover relay K1 to operate and transfer control to the precise control system. The system then continues under precise control unless an overspeed of motor 50 occurs as a result of the failure of the standard frequency control circuit 58, for example. If such an overspeed occurs, the cam 70 operates the switch 72 and thereby energizing the winding 73 of the fail-safe relay K2. Operation of the fail-safe relay K2 de-energizes the winding 30 of relay K4 which results in operation of the changeover relay K1 thereby causing control to revert to the carbon pile.

While I have shown and described only one embodiment of my invention which I intend to be merely illustrative of the principles of my invention, it will be understood by those skilled in the art that many variations and modifications thereof may be made without departing from the spirit and scope of this invention as defined in the following claims.

I claim:

1. A frequency regulator for controlling the output frequency of an alternator driven by a direct current motor, said direct current motor having a field winding adapted for energization in varying degrees for controlling the frequency of said alternator output, said regulator comprising first control means responsive to the speed of said motor for regulating the current through said winding to control the speed of said motor over relatively wide limits, a constant frequency alternating current source, a second motor connected to said source, a third motor connected to said alternator, a differential for comparing the speeds of said second and third motors, second control means responsive to said differential for controlling the current in said winding for regulating the speed of the first motor over relatively narrow limits, third means responsive to a predetermined amount of over-speed of the third motor relative to the second motor for permanently preventing the second control means from controlling the current through the winding and connecting the first control means to the motor winding and thereafter maintaining the first motor under control of the first control means regardless of speed.

2. A frequency regulator according to claim 1, wherein said third means includes a time delay relay, means for connecting the first control means to the winding for a predetermined time after starting of the first motor and thereafter disconnecting the first control means from the winding and connecting the second control means to the winding for controlling the current therein.

3. A regulator according to claim 2, wherein the first and second means include first and second variable resistors respectively, means including a changeover relay for connecting either of said variable resistors in series with said winding, switch means connected to said differential for controlling said relay to disconnect the second resistor from the winding and connect the first resistor in series with the winding.

4. A regulator according to claim 3, wherein said switch means includes a self-locking relay energized by said switch means in response to said predetermined amount of overspeed.

5. A regulator according to claim 4, wherein said switch means includes a switch and a cam connected to the differential and driven thereby, said cam being positioned so as to operate said switch when the cam is turned.

6. A regulator according to claim 3, wherein said second means includes a potentiometer, means connected to said differential for adjusting said potentiometer and amplifying means connected between said potentiometer and said second variable resistor for adjusting said second variable resistor to control the speed of the first motor in response to the output of the differential.

7. A regulator for controlling the output frequency of an alternator driven by a direct current motor having a field winding adapted for energization in varying degrees for controlling the frequency of said alternator output, said regulator comprising first means for controlling the speed of said motor within relatively wide limits and second means for controlling the speed of said motor within relatively precise limits, said second means including a source of constant frequency alternating current, means for comparing the frequency of the alternator output with the frequency of said source, a variable resistor, control means responsive to said comparing means for adjusting said variable resistor, means for normally maintaining the first means disabled and the second means in operative condition with the variable resistor thereof connected in series with the motor winding, and means responsive to a predetermined phase change of the alternator output relative to said constant frequency current for disconnecting said variable resistor from the winding and placing the motor permanently under the control of the first means irrespective of further variations of the speed of the motor.

8. A regulator according to claim 7, wherein said comparing means includes a second motor and a third motor, a differential having one input connected to said second motor and another input connected to said third motor, said differential having also an output shaft, said control means including an amplifier, means connected to the output of said amplifier for adjusting said variable resistor and means for impressing an input signal on said amplifier representative of the position of the output shaft of the differential.

9. A regulator according to claim 8, including power supply means for said amplifier and means for disconnecting said power supply means from the amplifier in response to the rotation of the output shaft of said differential produced by said predetermined phase change.

No references cited.